(12) United States Patent  (10) Patent No.: US 12,127,302 B2
Hong  (45) Date of Patent: Oct. 22, 2024

(54) NETWORK ACCESS METHOD AND APPARATUS, AND COMMUNICATION DEVICE AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 427 days.

(21) Appl. No.: 17/770,996

(22) PCT Filed: Oct. 22, 2019

(86) PCT No.: PCT/CN2019/112586
§ 371 (c)(1),
(2) Date: Apr. 21, 2022

(87) PCT Pub. No.: WO2021/077301
PCT Pub. Date: Apr. 29, 2021

(65) Prior Publication Data
US 2022/0369098 A1 Nov. 17, 2022

(51) Int. Cl.
H04W 24/02 (2009.01)
H04W 8/20 (2009.01)
H04W 68/00 (2009.01)
H04W 88/02 (2009.01)

(52) U.S. Cl.
CPC ........... H04W 8/205 (2013.01); H04W 68/00 (2013.01)

(58) Field of Classification Search
CPC .... H04W 8/205; H04W 68/00; H04W 68/005
See application file for complete search history.

(56) References Cited

U.S. PATENT DOCUMENTS

| 8,615,227 | B2 | 12/2013 | Su | |
| 9,461,685 | B2 | 10/2016 | Parron | |
| 2013/0150018 | A1 | 6/2013 | Su | |
| 2015/0163827 | A1 | 6/2015 | Ekici | |
| 2016/0112084 | A1 | 4/2016 | Parron | |
| 2017/0230932 | A1* | 8/2017 | Challa | H04W 68/02 |
| 2017/0325278 | A1* | 11/2017 | Ramkumar | H04W 8/082 |
| 2017/0359772 | A1* | 12/2017 | Lee | H04W 76/28 |
| 2017/0359800 | A1* | 12/2017 | Cui | H04W 64/00 |
| 2017/0359813 | A1 | 12/2017 | Lee | |
| 2020/0037380 | A1* | 1/2020 | Qiu | H04W 68/12 |

(Continued)

FOREIGN PATENT DOCUMENTS

CN 101951653 A 1/2011
CN 103220783 A 7/2013
(Continued)

OTHER PUBLICATIONS

IP.com search (Year: 2024).*
(Continued)

Primary Examiner — Moustapha Diaby
(74) Attorney, Agent, or Firm — Arch & Lake LLP

(57) ABSTRACT

A network access method. The network access method includes: receiving paging signaling by using a first SIM card in a terminal; and in response to determining that the paging signaling comprises identity information of at least two SIM cards in the terminal, selecting one SIM card from the at least two SIM cards to connect to a network.

20 Claims, 6 Drawing Sheets

(56) References Cited

U.S. PATENT DOCUMENTS

2020/0107293 A1* 4/2020 Cui .................... H04W 76/25
2020/0396714 A1* 12/2020 Lee ................... H04W 52/0216

FOREIGN PATENT DOCUMENTS

| CN | 105530024 A | 4/2016 |
| CN | 106028368 A | 10/2016 |
| CN | 106385675 A | 2/2017 |
| CN | 108811084 A | 11/2018 |
| CN | 110234176 A | 9/2019 |

OTHER PUBLICATIONS

ProQuest search (Year: 2024).*
International Search Report of PCT/CN2019/112586 dated Mar. 12, 2020 with English translation, (2 pages).
First Office Action of the Chinese Application No. 201980002532. X, issued Jan. 25, 2022, (15 pages).
First Office Action of the Chinese Application No. 201980002532, issued Jan. 25, 2022, (15 pages).

* cited by examiner

NETWORK ACCESS METHOD AND APPARATUS, AND COMMUNICATION DEVICE AND STORAGE MEDIUM

CROSS-REFERENCE TO RELATED APPLICATION

The application is a U.S. National Stage of International Application No. PCT/CN2019/112586 filed on Oct. 22, 2019, the entire content of which is incorporated herein by reference for all purposes.

TECHNICAL FIELD

The present disclosure relates to the field of wireless communication technologies, but are not limited to the field of wireless communication technologies, and in particular, relates to a network access method and apparatus, a communication device, and a storage medium.

BACKGROUND

With the development of wireless communication technology, there are more and more mobile phones with multi-Subscriber Identity Module (SIM) cards in the market. The typical application scenarios of the multi-SIM communication terminal, for example, the multi-SIM mobile phone include the following scenario: a business user has one personal SIM card and one business SIM card, and puts the two SIM cards in the same mobile phone.

SUMMARY

The present disclosure provides a network access method and apparatus, a communication device, and a storage medium.

The first aspect of the present disclosure provides a network access method, which is applied to a terminal, and the method includes: receiving paging signaling by a first SIM card in the terminal; and when the paging signaling includes identity information of at least two SIM cards in the terminal, selecting one SIM card from the at least two SIM cards to connect to a network.

The second aspect of the present disclosure provides a communication device, including: a transceiver; a memory; and a processing module respectively connected to the transceiver and the memory, and configured to, by executing computer-executable instructions stored in the memory, control the transceiver to send and receive a wireless signal and implement the network access method provided by any of the foregoing technical solutions.

The third aspect of the present disclosure provides a non-transitory computer storage medium, where the computer storage medium stores computer-executable instructions; and after the computer-executable instructions are executed by a processing module, the network access method provided by the first aspect of the disclosure can be implemented.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the embodiments of the present disclosure are only for the purpose of describing specific embodiments, and are not intended to limit the embodiments of the present disclosure. The singular forms of "a", "an" and "the" used in the embodiments of the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used to describe various information in the embodiments of the present disclosure, the information should not be limited to these terms. These terms are only used to distinguish the same type of information from each other. For example, without departing from the scope of the embodiments of the present disclosure, the first information may also be referred to as second information, and similarly, the second information may also be referred to as first information. Depending on the context, the words "if" as used herein can be interpreted as "when" or "while" or "in response to determination that . . . ".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
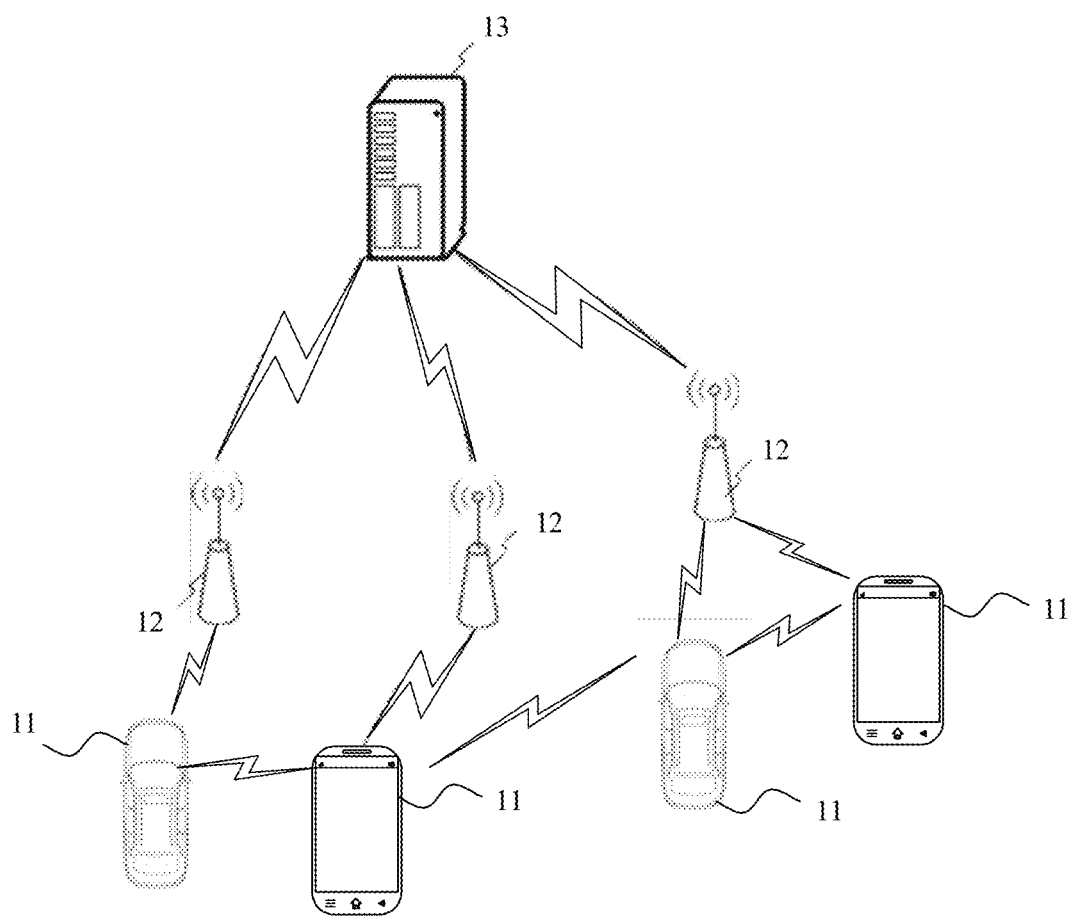
FIG. 1 is a schematic structural diagram of a wireless communication system according to one or more examples of the present disclosure.

FIG. 1 shows a schematic structural diagram of a wireless communication system provided by an embodiment of the present disclosure. As shown in FIG. 1, the wireless communication system is a communication system based on cellular mobile communication technology, and the wireless communication system may include: several terminals 11 and several base stations 12.

The terminal 11 may refer to a device that provides voice and/or data connectivity to the user. The terminal 11 may communicate with one or more core networks via a Radio Access Network (RAN). The terminal 11 may be an Internet of Things terminal, such as a sensor device and a mobile phone (or called a "cellular" phone), and may be a computer having the Internet of Things terminal, such as a fixed, portable, pocket-sized, handheld, computer built-in or vehicle-mounted apparatus. For example, it may be a Station (STA), a subscriber unit, a subscriber station, a mobile station, a mobile, a remote station, an access point, a remote terminal, an access terminal, a user apparatus (user terminal), a user agent, a user device, or a User Equipment (UE). Alternatively, the terminal 11 may also be a device of an unmanned aerial vehicle. Alternatively, the terminal 11 may also be an in-vehicle device, for example, it may be a trip computer with a wireless communication function, or a wireless communication device externally connected to the trip computer. Alternatively, the terminal 11 may also be a roadside device, for example, it may be a street lamp, a signal lamp, or other roadside device with a wireless communication function.

The base station 12 may be a network side device in the wireless communication system. The wireless communication system may be the a 5G system, also known as new radio (NR) system or 5G NR system. Alternatively, the wireless communication system may be a system supporting New Radio-Unlicense (NR-U). Alternatively, the wireless communication system may be a next-generation system of the 5G system. Among them, the access network in the 5G system may be called a New Generation-Radio Access Network (NG-RAN).

The base station 12 may be a base station (gNB) adopting a centralized and distributed architecture in the 5G system. When the base station 12 adopts the centralized and distributed architecture, it usually includes a central unit (CU) and at least two distributed units (DUs). The central unit is provided with protocol stacks of a Packet Data Convergence Protocol (PDCP) layer, a radio link layer control protocol (Radio Link Control, RLC) layer, and a Media Access Control (MAC) layer. The distributed unit is provided with a Physical (PHY) layer protocol stack. The embodiments of the present disclosure do not limit the specific implementation manner of the base station 12.

A wireless connection may be established between the base station 12 and the terminal 11 through a wireless air interface. In different implementations, the wireless air interface is a wireless air interface based on the $5^{th}$ generation mobile communication network technology (5G) standard, for example, the wireless air interface is a new air interface; or, the wireless air interface may also be a wireless air interface based on a 5G-based next-generation mobile communication network technology standard.

In some embodiments, an End to End (E2E) connection may also be established between the terminals 11. In some embodiments, the above-mentioned wireless communication system may further include a network management device 13.

Several base stations 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or Home Subscriber Server (HSS), etc. The implementation form of the network management device 13 is not limited in the embodiments of the present disclosure.

At the network side, one SIM card is regarded as one terminal. In this way, when performing terminal paging on the network side, different SIM cards are still individually paged. However, such paging method leads to a phenomenon that the paging signaling overhead is large and the power consumption of the terminal is large.

The processing methods for the multi-SIM mobile phone are mainly based on the implementation of various terminal manufacturers, and there is no unified standard for regulations, which leads to many different terminal behaviors and processing methods (for example, dual-SIM single-standby, dual-SIM dual-standby single-call, dual-SIM dual-standby dual-call, etc.). And for the multi-SIM terminals, the current network considers different SIM cards as different terminals, and the paging method is the same as paging a conventional UE. According to the relevant paging mechanism, the UE detects the paging signaling at its own Paging Occasion (PO), and if the paging signaling contains the identity information (for example, Paging UE-identity) matching its own identity, it is considered that it has received its own paging message, and it further establishes a connection with the base station.

The base station may page a plurality of terminals in one paging signaling. Then for the multi-SIM terminal scenario, especially for the multi-SIM terminal with only one receiving antenna, only one SIM card can receive the paging signaling at the same time. If the base station simultaneously pages a plurality of SIM cards of the multi-SIM terminal in one paging signaling, this may cause the problem of loss of the paging signaling for other SIM card(s) of the multi-SIM terminal, and further cause the user to not be able to select the network where the SIM card losing the paging signaling is located.

Figure 2:
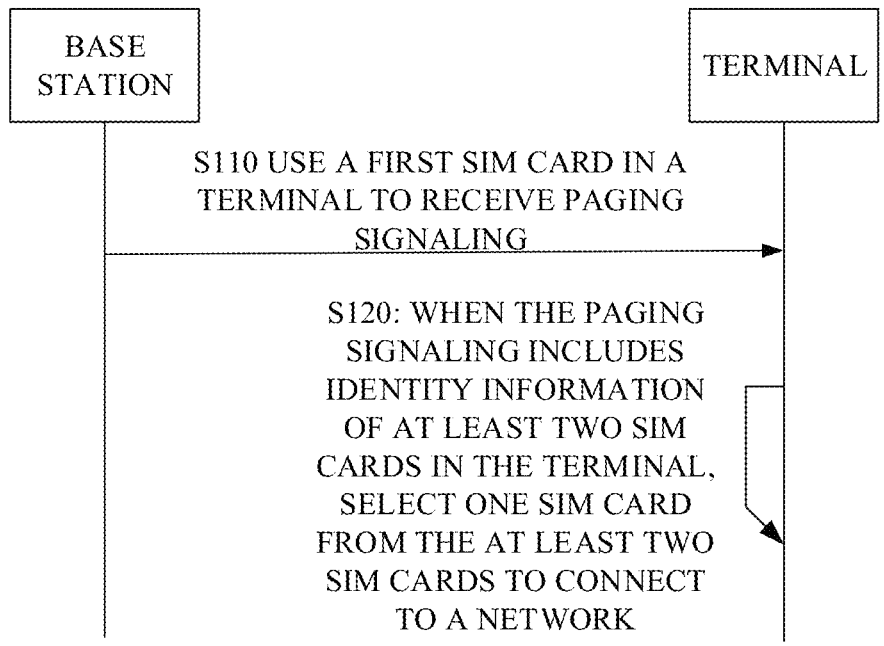
FIG. 2 is a schematic flowchart of a network access method provided by one or more examples of the present disclosure.

As shown in FIG. 2, the present embodiment provides a method for selecting an access network, which is applied to a terminal, and the method includes the following steps.

In S110: a paging signaling is received by a first SIM card in the terminal; where the first SIM card is one SIM card included in the terminal.

In S120: when the paging signaling includes identity information of at least two SIM cards in the terminal, one SIM card is selected from the at least two SIM cards to connect to a network. The at least two SIM cards here may include the first SIM card, or not include the first SIM card.

The method for selecting an access network provided in the embodiments of the present disclosure is applied to various terminals. The terminals here may include human-carried terminals such as mobile phones, tablet computers, and wearable devices, and may also be vehicle-mounted terminals carried in vehicles, and may also be IoT terminals such as smart home devices.

These terminals may be terminals carrying at least two SIM cards. These SIM cards may include: stand-alone SIM cards for stand-alone devices or embedded-SIM (eSIM) cards.

Since the terminal contains a plurality of SIM cards, these SIM cards may be connected to different networks. These different networks include: networks of different communication standards or networks of different operators. For example, networks of different communication standards may include: a SIM card that supports Code Division Multiple Access (CDMA) and a SIM card that does not support CDMA.

For example, the terminal to which the method of the embodiment of the present disclosure is applied may be: a dual-card single-standby terminal, a dual-card dual-standby single-call terminal, or a dual-card dual-standby dual-call terminal.

In some embodiments, a plurality of SIM cards simultaneously included in a terminal may belong to the same operator or belong to different operators of network sharing. If the plurality of SIM cards are from the same operator, at least two SIM cards in one terminal may be connected to the same network, and one or more network elements (for example, access network elements and/or core network elements) in these networks may share status information of the plurality of SIM cards.

In the embodiments of the present disclosure, if the terminal includes two or more SIM cards, only one SIM card among the plurality of SIM cards is used to receive the paging signaling. Specifically, for example, one SIM card is used to receive the paging signaling of two or more SIM cards in the terminal.

If the paging signaling simultaneously includes the paging signaling of two or more SIM cards in the terminal, one of the at least two SIM cards is selected to connect to the network.

In this way, when receiving the paging signaling, since one piece of paging signaling includes paging signalings of multiple SIM cards in one terminal, compared to sending the paging signalings separately, it is possible to ensure that all the paging signalings of the plurality of SIM cards can be received, it also reduces the number of paging signalings, reduces the signaling overhead generated by the separate sending of the paging signalings and the power consumption overhead of the terminal for receiving these paging signalings separately. In addition, when some multi-SIM terminals can only receive one message sent by the base station at one moment, they can receive paging messages of two or more SIM cards in one terminal based only on the antenna.

For example, when one or more SIM cards in the terminal are in an idle state or an active state, only one SIM card is required to receive the paging signaling, and the paging signaling may include the paging signalings of more than one SIM card in the terminal. Therefore, the loss of paging signalings of multi-SIM terminals with a single antenna can be reduced.

In step S110, the first SIM card may detect whether the paging signaling contains the identity information of at least two SIM cards in the terminal, so as to determine whether the received paging signaling contains the identity information of at least two SIM cards in the terminal.

For example, the SIM card that receives the paging signaling obtains the identity information of all SIM cards in the terminal in advance, and then, after receiving the paging signaling, this SIM card matches the identity information obtained in advance with an information unit carrying the identity information in the paging signaling, and according to the matching result, it is determined whether the currently received paging signaling contains the identity information of at least two SIM cards in the terminal.

The identity information may include: an S-Temporary Mobile Subscriber Identification (S-TMSI) or an International Mobile Subscriber Identification (IMSI) allocated by the network to the SIM card.

The SIM card that receives the paging signaling may read the identity information carried in the paging signaling to determine whether the received paging signaling contains its own identity information and/or the identity information of other SIM card(s) contained in the terminal.

Therefore, in some embodiments, one SIM card that receives the paging signaling needs to acquire the identity information of other SIM card(s) in the terminal in advance. In this way, when the paging signaling is received, it can be determined by matching the identity information whether the currently received paging signaling is the paging signaling sent to the terminal where this SIM card is located. If the paging signaling contains the identity information of the SIM card that receives the paging signaling or the identity information of other SIM card(s) in the terminal, it means that the paging signaling is for paging the terminal where the SIM card is located.

In some embodiments, after receiving the paging signaling, the first SIM card submits the paging signaling to a processing module, and the processing module determines whether the paging signaling includes the identity information of two or more SIM cards in the terminal. For example, the processing module matches the identity information of each SIM card in the terminal with the identity information in the paging signaling, so as to determine whether the paging signaling contains the identity information of the SIM card in the terminal and/or the number of the identity information.

In this way, in a terminal with a single antenna, when the single antenna is only used to receive the paging signaling of one SIM card, since the paging signaling may carry the identity information of two SIM cards of the terminal, it is realized that one SIM card receives the paging signaling of other SIM card(s), thereby reducing the loss of the paging signaling. At the same time, when the terminal can only access one network at a moment, the terminal may select one SIM from the plurality of SIM cards that are paged to access the network according to the received paging signaling, which is equivalent to allowing the terminal to flexibly selecting the SIM card to be connected to the network. Compared to selecting the paged SIM card to access the network according to the receiving order of the paging signaling carrying the identity information of a single SIM card, the flexibility of the terminal with a single antenna accessing to the network is improved. The SIM card selected for accessing the network may send a paging response to the network by the antenna of the terminal, so as to exit the idle state or the inactive state and enter the connected state. After entering the connected state, the terminal can send and receive data according to the connection with the network in the connected state.

Figure 3:
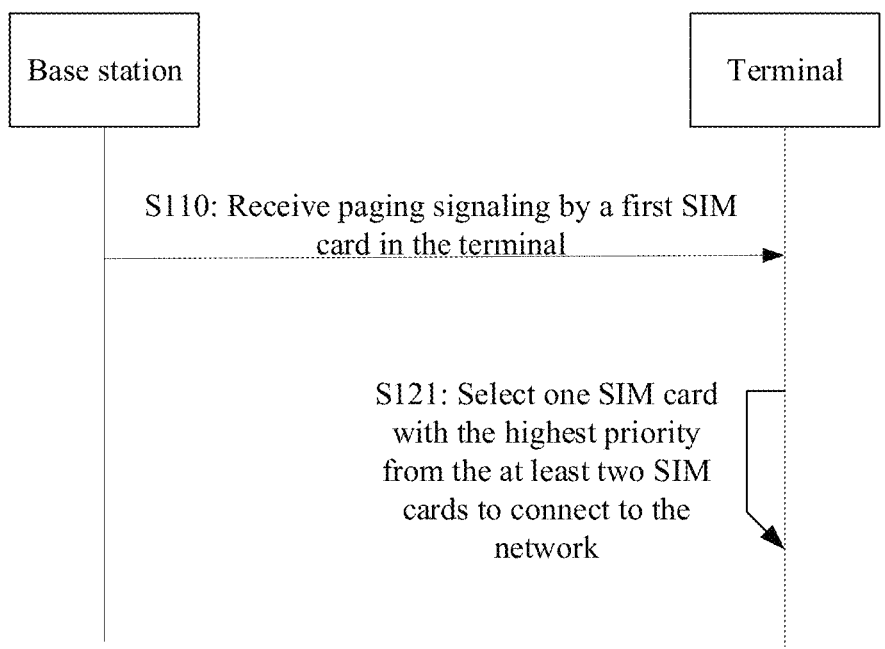
FIG. 3 is a schematic flowchart of another network access method provided by one or more examples of the present disclosure.

In some embodiments, as shown in FIG. 3, S120 may include S121; and S121 may include:

selecting one SIM card with the highest priority among at least two SIM cards to connect to the network.

For example, one terminal may contain two or more SIM cards, and the priority is configured for each SIM card according to the user's input operation. Alternatively, the priorities of part of the SIM cards are specified, and for the remaining SIM cards not specified with priorities, default priorities may be set for these SIM cards according to the default priority configuration. For example, the SIM cards with no priority configured have the lowest or highest priority by default. Alternatively, according to the frequency information of using the mobile cellular communication by the SIM card, the terminal sets the default priority according to the frequency of use. For example, the most frequently used SIM card has the highest priority.

In other embodiments, the priority of the SIM card may be set as follows: the terminal or network side configuring the priority of each SIM card according to at least one of historical usage information, payment information, subscription service information and usage information of subscription service of the plurality of SIM cards in the terminal.

For example, the priority of a SIM card with a high historical use frequency is higher than that of a SIM card with a low historical use frequency. For another example, the priority of a SIM card obtaining the highest cell signal quality or the highest service quality before the SIM card enters the inactive state or the idle state is higher than that of other SIM card(s).

For another example, the priority of a SIM card that is not currently in arrears is higher than the priority of a SIM card that is currently in arrears or has no remaining charges.

For another example, the priority of a SIM card with more types of subscription services is higher than the priority of a SIM card with less types of subscription services.

For another example, the priority of a SIM card with more subscription remaining traffic is higher than the priority of a SIM card with less subscription remaining traffic. The subscription remaining traffic here may be characterized by the usage status information of the subscription service.

In this way, through the configuration of the priorities of the SIM cards, one SIM card with a relatively high priority is selected to receive the paging signaling. If the paging signaling received by the SIM card contains its own paging message, the SIM card can directly exchange a connection establishment message with the network to connect to the network. For example, a random access request is directly sent to the network to request a connection, or a paging response message is directly sent and cell access is performed.

The first SIM card that receives the paging signaling may be the SIM card with the highest priority in the terminal, or may be the SIM card with any priority in the terminal.

When the paging signaling includes at least two SIM cards, and the first SIM card knows the priority of each SIM card in advance, the first SIM card can determine the SIM card that needs to be connected to the network currently according to the priorities, and directly inform the corresponding SIM card, or, inform the processing module of the SIM card that needs to connect to the network.

The processing module may include an Application Processor (AP), a Central Processing Unit (CPU), or an application-specific integrated circuit (ASIC).

In some embodiments, when the first SIM card detects that the paging signaling includes the identity information of two or more SIM cards in the terminal, the first SIM card informs the processing module; and the processing module selects the SIM card with the highest priority among the plurality of SIM cards that are paged by the paging signaling to connect to the network.

In some embodiments, the receiving the paging signaling by the first SIM card in the terminal includes:

receiving the paging signaling by the first SIM card with the highest priority in the terminal. At this time, the first SIM card is the SIM card with the highest priority in the terminal.

If the first SIM card with the highest priority in the terminal receives the paging signaling, and it is found that there is a paging message for paging the first SIM card in the paging signaling (that is, the paging signaling carries the identity information of the first SIM card), then the first SIM card is the SIM card with the highest priority in the terminal, and it responds to the paging request to connect to the network without forwarding the paging signaling to the processing module or notifying the processing module that the paging signaling containing two SIM cards is received.

In some other cases, even if the first SIM card is the SIM card with the highest priority, when the paging signaling containing the identity information of the first SIM card is received, the processing module may be notified, and the processing module may trigger the first SIM card to respond to the paging signaling and access the network.

If the paging signaling received by the first SIM card with the highest priority does not contain a paging message for itself, the received paging signaling may be sent to the application processing module, and the application processing module selects one SIM card from the paged SIM cards to connect to the network.

In some embodiments, the method further includes:
based on the user's instruction, determining the priorities of the SIM cards in the terminal;
or,
based on configuration information of a communication operator, determining the priorities of the SIM cards in the terminal.

For example, on the setting page of the terminal, the plurality of SIM cards included in the terminal may be seen, and controls for setting the plurality of SIM cards are displayed. The user instructions for these controls are detected, and the priority setting of the plurality of SIM cards is completed.

In some embodiments, the communication operator may deliver the configuration information to the terminal through an Access and Mobile management Function (AMF), and after the terminal receives the configuration information, the terminal configures the priority of each SIM card in the terminal according to the configuration information.

In some embodiments, the method further includes:
after receiving the paging signaling, detecting, by the first SIM card, whether the received paging signaling includes the identity information of at least two SIM cards in the terminal, according to the identity information of each SIM card in the terminal.

In some embodiments, S120 may include: triggering the first SIM card to send notification information to a processing module of the terminal, so that the processing module selects one SIM card with the highest priority from the at least two SIM cards to connect to the network, according to the notification information. That is, the first SIM card may send notification information to the processing module, and after receiving the notification information, the processing module selects one SIM card with the highest priority among the at least two SIM cards that are paged to connect to the network.

Figure 4:
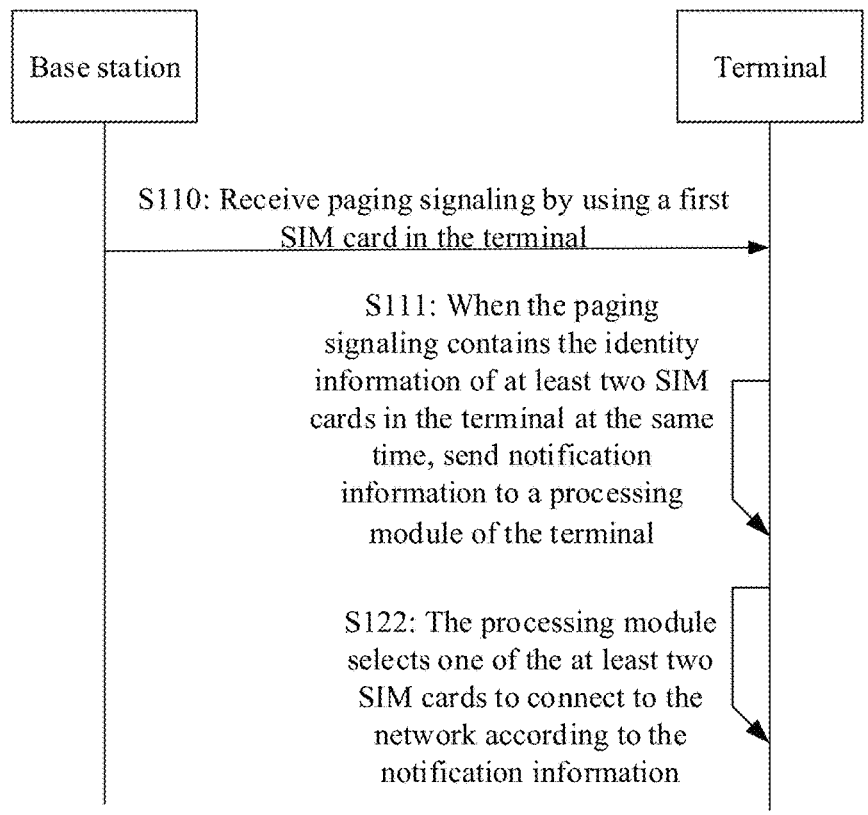
FIG. 4 is a schematic flowchart of still another network access method provided by one or more examples of the present disclosure.

As shown in FIG. 4, the method further includes the following steps.

In step S111: when the paging signaling includes the identity information of at least two SIM cards in the terminal, the first SIM card sends notification information to the processing module of the terminal.

S120 may include S122; and S122 may include: the processing module selecting one SIM card from the at least two SIM cards to connect to the network according to the notification information. In S122, the processing module may select the SIM card with the highest priority to connect to the network based on the priorities of the SIM cards.

In other embodiments, the processing module may also select a SIM card to be connected to the network according to other information. For example, the processing module selects the SIM that is the last one entering the idle or inactive state to connect to the network.

In some embodiments, if the received paging signaling only includes the identity information of one SIM card in the terminal, and if one piece of identity information included in the paging signaling is the identity information of the SIM card receiving the paging signaling, then this SIM card can send a paging response directly to connect to the network.

If the identity information contained in the paging signaling is not of the SIM card that receives the paging signaling, but is the identity information of another SIM card in the terminal. The first SIM card that receives the paging signaling may directly send the paging signaling to the SIM card that is paged, so as to realize a quick paging response.

If the paging signaling contains the identity information of a plurality of SIM cards at the same time, the processing module may select one SIM card to access the network, so the notification information is sent to the processing module.

In this way, the processing module can select one paged SIM card to connect to the network according to the received notification information.

In some embodiments, when the terminal includes two SIM cards, the notification information carries indication prompt information, and the prompt information is used to inform the processing module that the paging instruction including the identity information of the two SIM cards is received. The prompt information may be a 1-bit value indicating two states of whether the paging message for two SIM cards are received at the same time.

It is worth noting that when the terminal contains only two SIM cards, the notification information may still carry the identity information of the two SIM cards.

When the terminal contains more than two SIM cards, the notification information carries the identity information of at least two SIM cards contained in the paging instruction.

If one terminal contains the identity information of more than two SIM cards, the processing module may report the identity information of the plurality of paged SIM cards to the processing module in the notification information. In this way, the processing module can select one SIM card according to the identity information to trigger the terminal to access the network.

Figure 5:
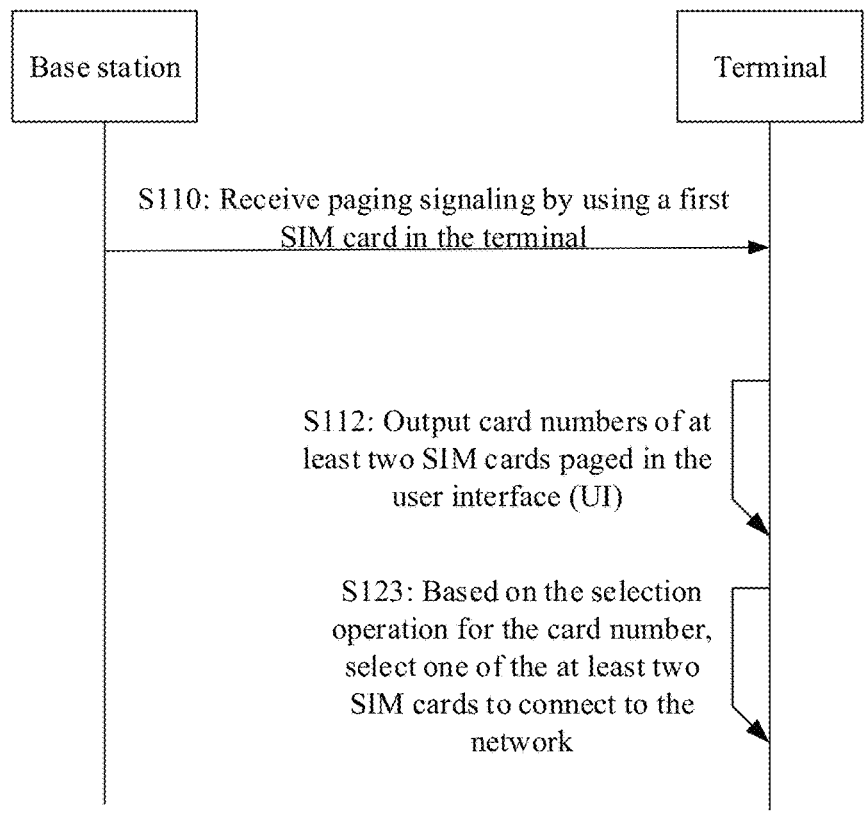

As shown in FIG. 5, the method further includes the following steps.

In S112: card numbers of the at least two SIM cards that are paged are output on a UI; where UI is an abbreviation of User Interface.

S120 may include S122; S123 may include: selecting one SIM card from the at least two SIM cards to connect to the network based on the selection operation for the card number.

For example, in some embodiments, the SIM card that receives the paging signaling may send the entire paging signaling to the processing module, and after the processing module receives the paging signaling, the UI outputs the card numbers of at least two paged SIM cards for the user to select the SIM card to be connected to the network.

For another example, in some embodiments, the SIM card that receives the paging signaling may send notification information to the processing module. After the processing module receives the notification information, the processing module may display a User Interface (UI) based on the notification information. The card numbers of the at least two SIM cards that are paged are output for the user to select the SIM card to be connected to the network.

In this way, when two or more SIM cards are paged in the terminal, the SIM card indicated by the user can be selected to connect to the network according to the user's current selection operation through the card numbers output in the UI.

The UI may be a display interface corresponding to a message bar of an operating system, or a voice call interface of a voice call component. The UI may also be a display interface specially designed to output the card numbers of the at least two paged SIM cards. In a word, there are many kinds of UI, and UI is not limited to any of the above examples.

In some embodiments, the method further includes: when the paging signaling carries the identity information of one SIM card in the terminal, selecting the SIM card identified by the identity information carried in the paging signaling to connect to the network.

When only one SIM card is paged by the paging signaling, the paged SIM card is directly used to connect to the network.

In some embodiments, the present disclosure provides a method for a user to select a network. The SIM card of the multi-SIM terminal that receives the paging signaling (referred to as SIM card #1 here) needs to know the identity information of all other SIM card(s) in the multi-SIM terminal. The identity information may include, but is not limited to, identity information used for paging. When SIM card #1 receives the paging signaling, in addition to detecting whether the paging signaling contains its own identity information, it also needs to detect whether the paging signaling contains identity information of other SIM card(s) of the multi-SIM terminal. If the paging signaling only includes the identity information of the SIM card #1, the SIM card #1 directly establishes a Radio Resource Control (RRC) connection with the base station. If the paging signaling also contains the identity information of other SIM card(s), the SIM card #1 notifies an upper layer. The upper layer here may be an Application Processor (AP) of the terminal.

The AP further informs the user through a User Interface (UI) that the base station is paging a plurality of SIM cards at the same time, and may inform the user of the card numbers of the paged SIM cards. The user selects the SIM card to be used to establish the RRC connection with the base station. Alternatively, the multi-SIM terminal may select the SIM card with the highest priority to establish the RRC connection according to the priorities of different SIM cards, and the priorities may be set by the user or by the communication operator.

With the network access method provided in the present embodiment, no problem of loss of the paging signaling occurs in the multi-SIM terminal when receiving the paging signaling, and the user is also free to choose which card to connect to the network.

Figure 6:
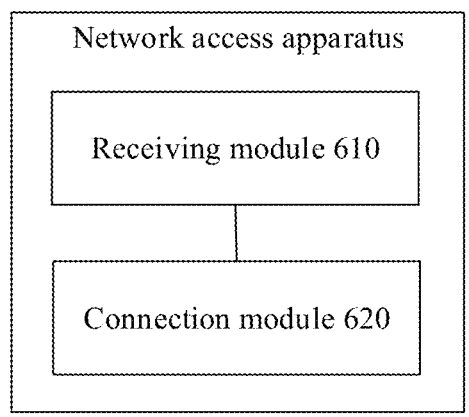
FIG. 6 is a schematic structural diagram of a network access apparatus according to one or more examples of the present disclosure.

As shown in FIG. 6, the present embodiment provides a network access apparatus, which is applied to a terminal, and the apparatus includes:

a receiving module 610, configured to receive paging signaling by using a first SIM card in the terminal; and a connection module 620, configured to select one SIM card from at least two SIM cards to connect to a network when the paging signaling includes identity information of the at least two SIM cards in the terminal.

In some embodiments, the receiving module 610 and the connection module 620 may both be a program module, and after the program modules are executed by the processor, the reception of the paging signaling and the connection of the network can be realized.

In other embodiments, the receiving module 610 and the connection module 620 may both be a module combining hardware and software, the module combining software and hardware includes a programmable array, and the programmable array includes a field programmable array and/or a complex programmable array.

In still other embodiments, the receiving module 610 and the connection module 620 may be pure hardware modules; and the pure hardware module may include an application specific integrated circuit.

In some embodiments, the connection module 620 is configured to select one SIM card with the highest priority among the at least two SIM cards to connect to the network.

In some embodiments, the receiving module 610 is configured to receive the paging signaling by the first SIM card with the highest priority in the terminal.

In some embodiments, the apparatus further includes:
a first determining module, configured to determine the priorities of the SIM cards in the terminal based on a user instruction;
or,
a second determining module, configured to determine the priorities of the SIM cards in the terminal based on configuration information of a communication operator.

In some embodiments, the apparatus further includes a sending module and a processing module.

The sending module triggers the first SIM card to send notification information to a processing module of the terminal, so that the processing module selects one SIM card with the highest priority among the at least two SIM cards according to the notification information to connect to the network.

In some embodiments, when the terminal includes two SIM cards, the notification information carries prompt information, and the prompt information is used to inform the processing module that a paging instruction containing the identity information of two SIM cards is received.

When the terminal contains more than two SIM cards, the notification information carries the identity information of at least two SIM cards contained in the paging instruction.

In some embodiments, the apparatus further includes:
an output module, configured to output card numbers of the at least two SIM cards that are paged on a user interface (UI); and
a connection module 620, configured to select one SIM card from the at least two SIM cards to connect to the network based on a selection operation for the card numbers.

In some embodiments, the apparatus further includes:
a detection module, configured for the first SIM card to detect, according to the identity information of each SIM card in the terminal, whether the received paging signaling contains the identity information of at least two SIM cards in the terminal.

In some embodiments, the apparatus further includes:
a selection module, configured to select the SIM card identified by the identity information carried in the paging signaling to connect to the network when the paging signaling carries the identity information of one SIM card in the terminal.

The embodiment of the present disclosure also provides a communication device, including:
a transceiver;
a memory; and
a processing module, respectively connected with the transceiver and the memory, and configured to control the transceiver to send and receive a wireless signal by executing computer-executable instructions stored in the memory, and realize the network access method provided by any of the foregoing embodiments, for example, the network access methods shown in any of FIG. 2 to FIG. 5.

The communication device may include: the aforementioned terminal or base station.

The processing module may include various types of processors and/or processing circuits.

The sixth aspect of the embodiments of the present disclosure further provides a computer-readable storage medium, where computer-executable instructions are stored on the computer-readable storage medium; after the computer-executable instructions are executed by a processing module, the network access method provided by any of the foregoing embodiments, for example, the network access method shown in any of FIG. 2 to FIG. 5, can be implemented.

The communication device provided in the present embodiment includes: a transceiver, a memory, and a processing module. The transceiver is configured to interact with other device(s), including but not limited to a transceiver antennas. The memory may store computer-executable instructions. The processing module is connected to the transceiver and the memory respectively, and may implement the network access method provided by any of the foregoing technical solutions.

In an exemplary embodiment, a non-transitory computer-readable storage medium including instructions, such as a memory including instructions, is also provided, and the above-mentioned instructions may be executed by a processing module, and by executing the above-mentioned instructions, the processing module can realize any one of the foregoing network access method provided by any one of the above-mentioned technical solutions.

Figure 7:
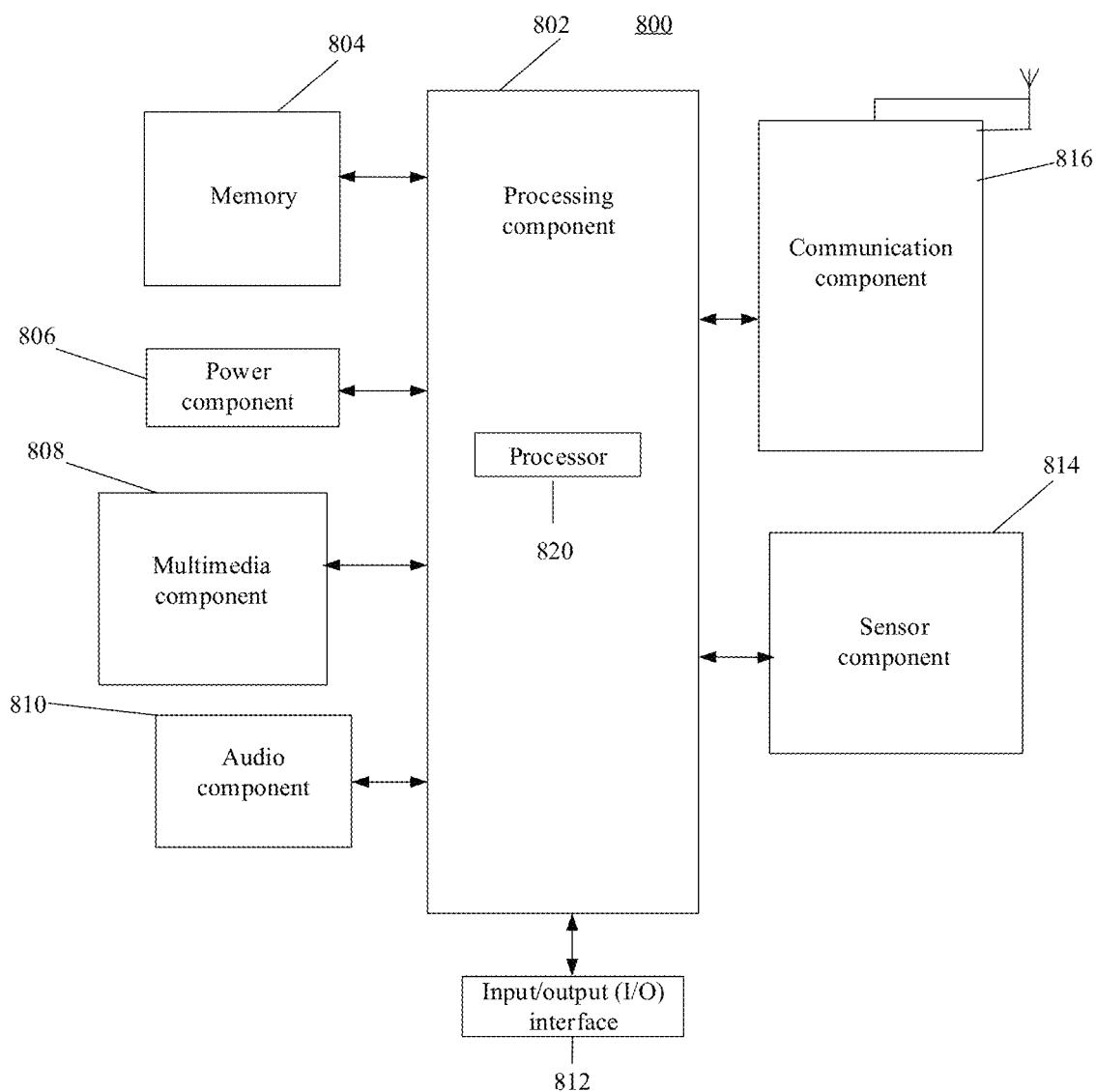
FIG. 7 is a schematic structural diagram of a terminal according to one or more examples of the present disclosure.

FIG. 7 illustrates a terminal according to an exemplary embodiment. Specifically, the terminal may be a mobile phone, a computer, a digital broadcast terminal, a messaging apparatus, a gaming console, a tablet, a medical apparatus, exercise equipment, a personal digital assistant, etc.

Referring to FIG. 7, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other apparatus. The terminal 800 may access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 804 including instructions, the above instructions may be executed by the processor 820 in the terminal 800 for performing the above-described methods. For example, the non-transitory computer-readable storage medium may be a ROM, a Random Access Memory (RAM), a CD-ROM, a magnetic tape, a floppy disc, an optical data storage device, and the like.

Figure 8:
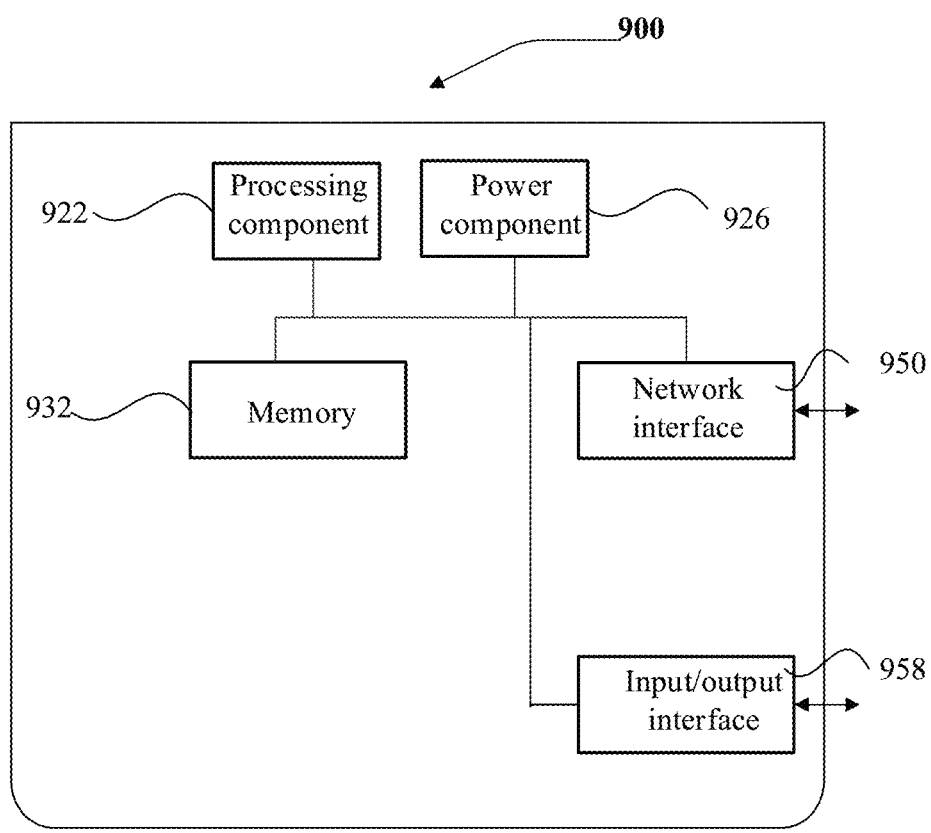
FIG. 8 is a schematic structural diagram of a base station according to one or more examples of the present disclosure.

FIG. 8 is a schematic diagram of a base station. Referring to FIG. 8, the base station 900 includes a processing component 922, which further includes one or more processors and a memory resource represented by a memory 932 for storing instructions executable by the processing component 922, such as an application program. The application program stored in the memory 932 may include one or more modules, each corresponding to a set of instructions. In addition, the processing component 922 is configured to execute the instructions to execute the network access method shown in FIG. 4 and/or FIG. 5.

The base station 900 may also include: a power component 926 configured to perform power management of the base station 900, a wired or wireless network interface 950 configured to connect the base station 900 to the network, and an input/output (I/O) interface 958. The base station 900 may operate an operating system stored in the memory 932, such as Windows Server™, Mac OS X™, UNIX™, Linux™, Free BSD™, or the like.

In the technical solutions provided by the embodiments of the present disclosure, when the SIM card is used to receive the paging signaling, if it is determined that the paging signaling contains the identity information of a plurality of SIM cards in the terminal at the same time, one of the plurality of SIM cards may be selected for network access. In this way, even for a single-antenna terminal, it is possible to use one SIM card to receive the paging signaling for paging other SIM card(s), thereby reducing the loss of the paging signaling and improving the success rate of paging. At the same time, the terminal can freely select one SIM card to connect to the network according to the paged at least two SIM cards, which improves the flexibility of the single-antenna terminal to connect to the network.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A network access method, comprising:
   receiving, by a terminal, paging signaling by a first Subscriber Identity Module (SIM) card in the terminal; and
   in response to determining that the paging signaling comprises identity information of at least two SIM cards in the terminal, selecting one SIM card from the at least two SIM cards to connect to a network.

2. The method according to claim 1, wherein selecting one SIM card from the at least two SIM cards to connect to the network comprises:
   selecting one SIM card with a highest priority from the at least two SIM cards to connect to the network.

3. The method according to claim 2, wherein receiving the paging signaling by the first SIM card in the terminal comprises:
   receiving the paging signaling by the first SIM card with the highest priority in the terminal.

4. The method according to claim 2, wherein the method further comprises:
   determining priorities of the at least two SIM cards in the terminal based on a user instruction; or
   determining the priorities of the at least two SIM cards in the terminal based on configuration information of a communication operator.

5. The method according to claim 2, wherein selecting one SIM card with the highest priority from the at least two SIM cards to connect to the network comprises:
   triggering the first SIM card to send notification information to a processor of the terminal, and selecting, by the processor, one SIM card with the highest priority from the at least two SIM cards to connect to the network according to the notification information.

6. The method according to claim 5, wherein,
   in response to determining that the terminal comprises two SIM cards, the notification information carries prompt information, and the prompt information is configured for informing the processor that a paging instruction containing the identity information of the two SIM cards is received; and
   in response to determining that the terminal comprises more than two SIM cards, the notification information carries the identity information of the at least two SIM cards.

7. The method according to claim 1, wherein the first SIM card obtains the identity information of the at least two SIM cards in advance, and the method further comprises:
   after receiving the paging signaling, detecting, by the first SIM card, whether the received paging signaling comprises the identity information of the at least two SIM cards in the terminal according to the identity information of the at least two SIM cards in the terminal.

8. The method according to claim 1, wherein the method further comprises:
   in response to determining that the paging signaling carries the identity information of one SIM card in the terminal, selecting a SIM card identified by the identity information carried in the paging signaling to connect to the network.

9. A network access apparatus, applied to a terminal, the apparatus comprising:
   a transceiver;
   a memory; and
   a processor respectively connected to the transceiver and the memory, and configured to, by executing computer-executable instructions stored in the memory, control the transceiver to send and receive a wireless signal, and implement:
   receiving paging signaling by a first Subscriber Identity Module (SIM) card in the terminal; and
   in response to determining that the paging signaling comprises identity information of at least two SIM cards in the terminal, selecting one SIM card from the at least two SIM cards to connect to a network.

10. The apparatus according to claim 9, wherein the processor is further configured to select one SIM card with a highest priority from the at least two SIM cards to connect to the network.

11. The apparatus according to claim 10, wherein the processor is further configured to receive the paging signaling via the transceiver by the first SIM card with the highest priority in the terminal.

12. The apparatus according to claim 10, wherein the processor is further configured to:
   determine priorities of the at least two SIM cards in the terminal based on a user instruction; or
   determine the priorities of the at least two SIM cards in the terminal based on configuration information of a communication operator.

13. The apparatus according to claim 10, wherein the processor is further configured to
   trigger the first SIM card to send notification information to the processor of the terminal, and select one SIM card with the highest priority from the at least two SIM cards to connect to the network according to the notification information.

14. The apparatus according to claim 13, wherein,
   in response to determining that the terminal comprises two SIM cards, the notification information carries prompt information, and the prompt information is configured for informing the processor that a paging instruction containing the identity information of the two SIM cards is received; and
   in response to determining that the terminal comprises more than two SIM cards, the notification information carries the identity information of the at least two SIM cards comprised in the paging instruction.

15. The apparatus according to claim 9, wherein the first SIM card obtains the identity information of the at least two SIM cards in advance, and the processor is further configured to:

detect, by the first SIM card, whether the received paging signaling comprises the identity information of the at least two SIM cards in the terminal according to the identity information of the at least two SIM cards in the terminal.

16. The apparatus according to claim 9, wherein the processor is further configured to:

in response to that the paging signaling carries the identity information of one SIM card in the terminal, select the SIM card identified by the identity information carried in the paging signaling to connect to the network.

17. A non-transitory computer storage medium, wherein the computer storage medium stores computer-executable instructions; and after the computer-executable instructions are executed by a processing module, the following steps are implemented:

receiving paging signaling by using a first Subscriber Identity Module (SIM) card in a terminal; and in response to determining that the paging signaling comprises identity information of at least two SIM cards in the terminal, selecting one SIM card from the at least two SIM cards to connect to a network.

18. The non-transitory computer storage medium according to claim 17, wherein the following steps are further implemented: selecting one SIM card with a highest priority from the at least two SIM cards to connect to the network.

19. The non-transitory computer storage medium according to claim 17, wherein the following steps are further implemented:

receiving the paging signaling by the first SIM card with the highest priority in the terminal.

20. The non-transitory computer storage medium according to claim 17, wherein the following steps are further implemented:

determining priorities of the at least two SIM cards in the terminal based on a user instruction; or determining the priorities of the at least two SIM cards in the terminal based on configuration information of a communication operator.

\* \* \* \* \*